(12) United States Patent
Higuchi et al.

(10) Patent No.: US 11,350,257 B2
(45) Date of Patent: May 31, 2022

(54) PROXY ENVIRONMENTAL PERCEPTION

(71) Applicant: Toyota Motor Engineering & Manufacturing North America, Inc., Plano, TX (US)

(72) Inventors: Takamasa Higuchi, Mountain View, CA (US); Seyhan Ucar, Mountain View, CA (US); Onur Altintas, Mountain View, CA (US)

( * ) Notice: Subject to any disclaimer, the term of this patent is extended or adjusted under 35 U.S.C. 154(b) by 0 days.

(21) Appl. No.: 16/990,988

(22) Filed: Aug. 11, 2020

(65) Prior Publication Data
US 2022/0053308 A1 Feb. 17, 2022

(51) Int. Cl.
| | |
|---|---|
| H04W 4/44 | (2018.01) |
| H04L 67/561 | (2022.01) |
| H04L 67/101 | (2022.01) |
| H04W 4/46 | (2018.01) |
| H04L 67/1008 | (2022.01) |
| G06V 20/56 | (2022.01) |

(52) U.S. Cl.
CPC ............ *H04W 4/44* (2018.02); *G06V 20/588* (2022.01); *H04L 67/101* (2013.01);
(Continued)

(58) Field of Classification Search
CPC ........... H04W 4/40; H04W 4/42; H04W 4/44; H04W 4/46; H04W 4/48; H04L 67/101;
(Continued)

(56) References Cited

U.S. PATENT DOCUMENTS

| | | |
|---|---|---|
| 7,994,902 B2 | 8/2011 | Avery et al. |
| 9,723,473 B2 | 8/2017 | Shimizu et al. |

(Continued)

FOREIGN PATENT DOCUMENTS

JP 2017187863 6/2019

OTHER PUBLICATIONS

Gunther, Hendrik-Jorn et al, "Collective perception and decentralization congestion control in vehicular ad-hoc networks," 2016 IEEE Vehicular Networking Conference (VNC), 2016, pp. 1-6.
(Continued)

*Primary Examiner* — Brian Whipple
(74) *Attorney, Agent, or Firm* — Burbage Law, P.C.; Jon-Michael Burbage

(57) ABSTRACT

The disclosure includes embodiments for an ego vehicle to offload a responsibility for executing an environmental perception analysis of a roadway environment to a different endpoint of a vehicular micro cloud that includes the ego vehicle. A method includes generating sensor data describing whether the sensor has a clear field of view of the roadway environment. The method includes determining performance data describing a computing performance ability of the different endpoint. The method includes determining network data describing an end-to-end latency of transmitting a wireless communication to the different endpoint. The method includes determining that the ego vehicle should offload the responsibility to the different endpoint based on a comparison of the sensor data, performance data, and network data to conditions data describing conditions where the ego vehicle should offload the responsibility. The method includes executing steps that cause the ego vehicle to offload the responsibility to the different endpoint.

20 Claims, 3 Drawing Sheets

(52) U.S. Cl.
CPC ...... *H04L 67/1008* (2013.01); *H04L 67/2804* (2013.01); *H04W 4/46* (2018.02)

(58) Field of Classification Search
CPC ............ H04L 67/1008; H04L 67/2804; G06K 9/00798
See application file for complete search history.

(56) References Cited

U.S. PATENT DOCUMENTS

| | | |
|---|---|---|
| 10,178,531 B2 | 1/2019 | Nguyen et al. |
| 10,334,405 B2 | 6/2019 | Altintas et al. |
| 10,440,096 B2 | 10/2019 | Sabella et al. |
| 2020/0077240 A1* | 3/2020 | Bansal ................ H04L 43/0811 |

OTHER PUBLICATIONS

ETSI ITS, "Intelligent Transport System (ITS); Vehicular Communications; Basic Set of Applications; Analysis of the Collective-Perception (CPS)," 2014, 44 pages.

ETSI ITS, "Intelligent Transport Systems (ITS); Vehicular Communications; Basic Set of Applications; Part 2: Specification of Cooperative Awareness Basic Service," 2019, 119 pages.

Thandavarayan, Gokulnath et al., "Generation of Cooperative Perception Messages for Connected and Automated Vehicles," arXiv preprint arXiv:1908.11151, 2019, 6 pages.

* cited by examiner

PROXY ENVIRONMENTAL PERCEPTION

BACKGROUND

The specification relates to proxy environmental perception. Some embodiments relate to proxy environmental perception of a roadway environment for a connected vehicle.

Connected vehicles form clusters of interconnected vehicles (e.g., via vehicle-to-everything, i.e., "V2X") that are located at a similar geographic location. Distributed data storage and computing by a cluster of connected vehicles is a promising solution to cope with an increasing network traffic generated for and by connected vehicles. Vehicles collaboratively store (or cache) data sets in their onboard data storage devices and compute and share these data sets over vehicle-to-vehicle (V2V) networks as requested by other vehicles. Using clusters removes the need for connected vehicles to access remote cloud servers or edge servers by vehicle-to-network (V2N) communications (e.g., by cellular networks) whenever they need to get access to computing resources such as shared data (e.g., high-definition road map for automated driving), shared computational power, and cloudification services.

Modern vehicles include Advanced Driver Assistance Systems (herein "ADAS systems") or automated driving systems. An automated driving system is a collection of ADAS systems which provides sufficient driver assistance that a vehicle is autonomous. ADAS systems and automated driving systems are referred to as "vehicle control systems."

A particular vehicle that includes these vehicle control systems is referred to herein as an "ego vehicle" and other vehicles in the vicinity of the ego vehicle are referred to as "remote vehicles."

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for an ego vehicle to offload a responsibility for executing an environmental perception analysis of a roadway environment to a different endpoint of a vehicular micro cloud that includes the ego vehicle, the method including: generating, based on a measurement recorded by a sensor of the ego vehicle, sensor data describing whether the sensor has a clear field of view of the roadway environment; determining, by a processor of the ego vehicle, performance data describing a computing performance ability of the different endpoint; determining, by the processor, network data describing an end-to-end latency of transmitting a wireless communication to the different endpoint; determining, by the processor, that the ego vehicle should offload the responsibility to the different endpoint based on a comparison of the sensor data, performance data, and network data to conditions data describing conditions where the ego vehicle should offload the responsibility; and executing steps, by the processor, that cause the ego vehicle to offload the responsibility to the different endpoint. Other embodiments of this aspect include corresponding computer systems, apparatus, and computer programs recorded on one or more computer storage devices, each configured to perform the actions of the methods.

Implementations may include one or more of the following features. The method where the ego vehicle is a leader node of the vehicular micro cloud that is responsible for managing when endpoints of the vehicular micro cloud enter and exit the vehicular micro cloud. The method where the method is a perception service and the ego vehicle is a leader node of the vehicular micro cloud that provides the perception service to endpoints of the vehicular micro cloud. The method where the different endpoint is selected from a group that includes: a remote vehicle; a cloud server; an edge server; and the vehicular micro cloud itself. The method where the sensor data indicates that the sensor does not have a clear field of view, where the clear field of view is a field of view that satisfies a clarity threshold. The method where the conditions are selected from a group that includes: the sensor data indicates that the sensor has an unclear field of view; the processor of the ego vehicle has a computing power that is less than the different endpoint; the sensor of the ego vehicle has a perception ability that is less than the different endpoint; and the network data indicates that offloading the responsibility would satisfy a latency threshold. The method where the steps for offloading the responsibility are scheduled by a task scheduler of the ego vehicle based on a set of criteria. Implementations of the described techniques may include hardware, a method or process, or computer software on a computer-accessible medium.

One general aspect includes a computer program product included in at least one onboard vehicle computer of an ego vehicle which is operable to offload a responsibility for executing an environmental perception analysis of a roadway environment to a different endpoint of a vehicular micro cloud that includes the ego vehicle, the computer program product including computer code that is operable, when executed by the onboard vehicle computer, to cause the onboard vehicle computer to execute steps including: generating, based on a measurement recorded by a sensor of the ego vehicle, sensor data describing whether the sensor has a clear field of view of the roadway environment; determining, by a processor of the ego vehicle, performance data describing a computing performance ability of the different endpoint; determining, by the processor, network data describing an end-to-end latency of transmitting a wireless communication to the different endpoint; determining, by the processor, that the ego vehicle should offload the responsibility to the different endpoint based on a comparison of the sensor data, performance data, and network data to conditions data describing conditions where the ego vehicle should offload the responsibility; and executing steps, by the processor, that cause the ego vehicle to offload the responsibility to the different endpoint. Other embodiments of this aspect include corresponding computer systems, apparatus, and computer programs recorded on one or more computer storage devices, each configured to perform the actions of the methods.

Implementations may include one or more of the following features. The computer program product where the ego vehicle is a leader node of the vehicular micro cloud that is responsible for managing when endpoints of the vehicular micro cloud enter and exit the vehicular micro cloud. The computer program product where executing the steps includes providing a perception service and the ego vehicle is a leader node of the vehicular micro cloud that provides the perception service to endpoints of the vehicular micro cloud. The computer program product where the different endpoint is selected from a group that includes: a remote vehicle; a cloud server; an edge server; and the vehicular micro cloud itself. The computer program product where the sensor data indicates that the sensor does not have a clear field of view, where the clear field of view is a field of view that satisfies a clarity threshold. The computer program product where the conditions are selected from a group that includes: the sensor data indicates that the sensor has an unclear field of view; the processor of the ego vehicle has a computing power that is less than the different endpoint; the sensor of the ego vehicle has a perception ability that is less than the different endpoint; and the network data indicates that offloading the responsibility would satisfy a latency threshold. The computer program product where the steps for offloading the responsibility are scheduled by a task scheduler of the ego vehicle based on a set of criteria. Implementations of the described techniques may include hardware, a method or process, or computer software on a computer-accessible medium.

One general aspect includes a system included in an ego vehicle which is operable to offload a responsibility for executing an environmental perception analysis of a roadway environment to a different endpoint of a vehicular micro cloud that includes the ego vehicle, the system including: a processor; a communication unit; a non-transitory memory communicatively coupled to the processor and the communication unit, which are communicatively coupled to one another, where the non-transitory memory stores executable code that is operable, when executed by the processor, to cause the processor to: generate, based on a measurement recorded by a sensor of the ego vehicle, sensor data describing whether the sensor has a clear field of view of the roadway environment; determine, by a processor of the ego vehicle, performance data describing a computing performance ability of the different endpoint; determine, by the processor, network data describing an end-to-end latency of transmitting a wireless communication to the different endpoint; and determine, by the processor, that the ego vehicle should offload the responsibility to the different endpoint based on a comparison of the sensor data, performance data, and network data to conditions data describing conditions where the ego vehicle should offload the responsibility. The system also includes execute steps, by the processor, that cause the ego vehicle to offload the responsibility to the different endpoint. Other embodiments of this aspect include corresponding computer systems, apparatus, and computer programs recorded on one or more computer storage devices, each configured to perform the actions of the methods.

Implementations may include one or more of the following features. The system where the ego vehicle is a leader node of the vehicular micro cloud that is responsible for managing when endpoints of the vehicular micro cloud enter and exit the vehicular micro cloud. The system where executing the steps includes providing a perception service and the ego vehicle is a leader node of the vehicular micro cloud that provides the perception service to endpoints of the vehicular micro cloud. The system where the different endpoint is selected from a group that includes: a remote vehicle; a cloud server; an edge server; and the vehicular micro cloud itself. The system where the sensor data indicates that the sensor does not have a clear field of view, where the clear field of view is a field of view that satisfies a clarity threshold. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Modern vehicles include Advanced Driver Assistance Systems (ADAS) systems or automated driving systems. These systems are referred to herein collectively or individually as "vehicle control systems." An automated driving system includes a sufficient number of ADAS systems so that the vehicle which includes these ADAS systems is rendered autonomous by the benefit of the functionality received by the operation of the ADAS systems by a processor of the vehicle. An example of a vehicle control system according to some embodiments includes the vehicle control system 153 depicted in FIG. 2.

Figure 1:
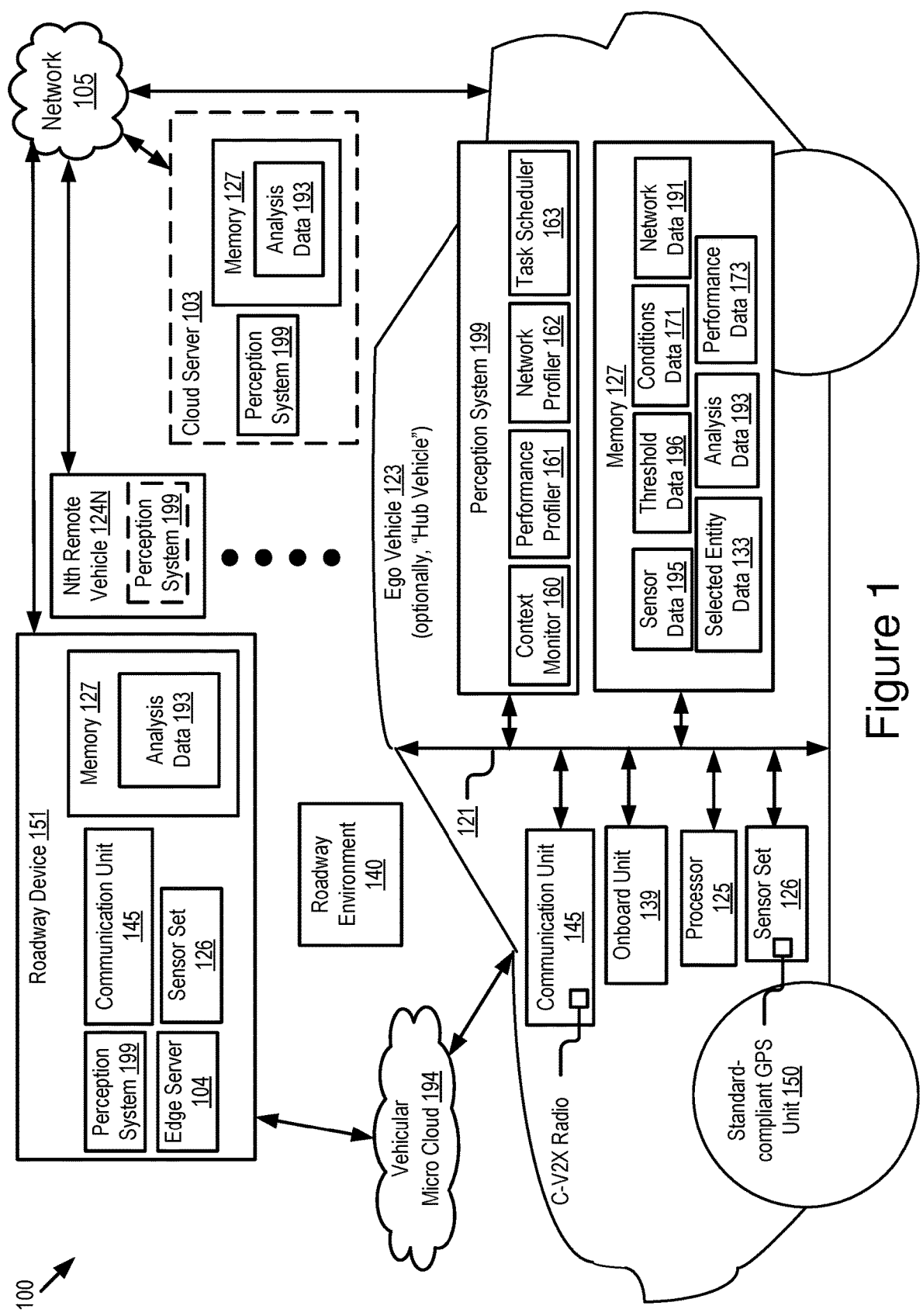
FIG. 1 is a block diagram illustrating an operating environment for a perception system according to some embodiments.

A particular vehicle that includes these vehicle control systems is referred to herein as an "ego vehicle" and other vehicles in the vicinity of the ego vehicle as "remote vehicles." As used herein, the term "vehicle" includes a connected vehicle that includes a communication unit and is operable to send and receive V2X communications via a wireless network (e.g., the network 105 depicted in FIG. 1).

Modern vehicles collect a lot of data describing their environment, in particular image data. An ego vehicle uses this image data to understand their environment and operate their vehicle control systems (e.g., ADAS systems or automated driving systems).

As automated vehicles and ADAS systems become increasingly popular, it is important that vehicles have access to the best possible digital data that describes their surrounding environment. In other words, it is important for modern vehicles to have the best possible environmental perception abilities.

Vehicles perceive their surrounding environment by having their onboard sensors record sensor measurements and then analyzing the sensor data to identify one or more of the following: which objects are in their environment; where these objects are located in their environment; and various measurements about these objects (e.g., speed, heading, path history, etc.). This invention is about helping vehicles to have the best possible environmental perception abilities.

Vehicles use their onboard sensors and computing resources to execute perception algorithms that inform them about the objects that are in their environment, where these objects are located in their environment, and various measurements about these objects (e.g., speed, heading, path history, etc.).

The Variable Computational Ability Problem

An example of the variable computational ability problem is now described. Some vehicles have better sensors, onboard computers, or perception algorithms installed in them than other vehicles. Because of this, different vehicles have different abilities with regard to one or more of the following example variables: their computational latency; the number of objects they can detect; the types of objects they can detect; the measurements about these objects that they can record; and the accuracy of their detection abilities.

Described herein are embodiments of a perception system. The embodiments of the perception system provide numerous benefits including, among other things, solving the variable computational ability problem by providing functionality which beneficially enables vehicles to offload responsibility for executing an environmental perception analysis to another computing entity (e.g., an edge server, another vehicle, or a vehicular micro cloud) which is better equipped to perform this analysis. In some embodiments, the perception system also provides vehicles with a way to determine when they should offload responsibility for perceiving their environment to another computing entity.

Vehicle Cloudification

A vehicular micro cloud includes a group of connected vehicles that communicate with one another via V2X messages to provide a location data correction service.

The vehicular micro cloud includes multiple members. A member of the vehicular micro cloud includes a connected vehicle that sends and receives V2X messages via the serverless ad-hoc vehicular network. In some embodiments, the members of the serverless ad-hoc vehicular network are nodes of the serverless ad-hoc vehicular network.

In some embodiments, a serverless ad-hoc vehicular network is "serverless" because the serverless ad-hoc vehicular network does not include a server. In some embodiments, a serverless ad-hoc vehicular network is "ad-hoc" because the serverless ad-hoc vehicular network is formed its members when it is determined by one or more of the members to be needed or necessary. In some embodiments, a serverless ad-hoc vehicular network is "vehicular" because the serverless ad-hoc vehicular network only includes connected vehicles as its endpoints. In some embodiments, the term "network" refers to a V2V network.

In some embodiments, the vehicular micro cloud only includes vehicles. For example, the serverless ad-hoc network does not include the following: an infrastructure device, a base station, a roadside device, an edge server, an edge node, and a cloud server. An infrastructure device includes any hardware infrastructure device in a roadway environment such as a traffic signal, traffic light, traffic sign, or any other hardware device that has or does not have the ability to wirelessly communicate with a wireless network.

In some embodiments, the serverless ad-hoc vehicular network includes a set of sensor rich vehicles. A sensor rich vehicle is a connected vehicle that includes a rich sensor set. An operating environment that includes the serverless ad-hoc vehicular network also includes a legacy vehicle. A legacy vehicle is a connected vehicle that includes a legacy sensor set. The overall sensing ability of the rich sensor set is greater than the overall sensing ability of the legacy sensor set. For example, a roadway environment includes a set of sensor rich vehicles and a legacy vehicle; the rich sensor set is operable to generate sensor measurements that more accurately describe the geographic locations of objects in the roadway environment when compared to the sensor measurements generated by the legacy sensor set.

In some embodiments, the legacy vehicle is an element of the serverless ad-hoc vehicular network. In some embodiments, the legacy vehicle is not an element of the serverless ad-hoc vehicular network but receives a benefit of a location data correction service for location data that is provided by the members of the serverless ad-hoc vehicular network. For example, the legacy vehicle is provided with correction data that enables the legacy vehicle to modify its own sensor data to adjust for variances in the sensor measurements recorded by the legacy sensor set relative to the sensor measurements recorded by the rich sensor sets of the sensor rich vehicles that are included in the serverless ad-hoc vehicular network. In this way, the serverless ad-hoc vehicular network is operable to improve the operation of the legacy vehicle, which in turn increases the safety of the sensor rich vehicles that are traveling in a vicinity of the legacy vehicle.

In some embodiments, the serverless ad-hoc vehicular network is a vehicular micro cloud. It is not a requirement of the embodiments described herein that the serverless ad-hoc vehicular network is a vehicular micro cloud. Accordingly, in some embodiments the serverless ad-hoc vehicular network is not a vehicular micro cloud.

In some embodiments, the serverless ad-hoc vehicular network includes a similar structure is operable to provide some or all of the functionality as a vehicular micro cloud. Accordingly, a vehicular micro cloud is now described according to some embodiments to provide an understanding of the structure and functionality of the serverless ad-hoc vehicular network according to some embodiments. When describing the vehicular micro cloud, the term "vehicular micro cloud" can be replaced by the term "vehicular micro cloud" since a vehicular micro cloud is an example of a vehicular micro cloud in some embodiments.

Distributed data storage and computing by a group of connected vehicles (i.e., a "vehicular micro cloud") is a promising solution to cope with an increasing network traffic generated for and by connected vehicles. In some embodiments, a vehicular micro cloud is an example of a vehicular micro cloud. Vehicles collaboratively store (or cache) data sets in their onboard data storage devices and compute and share these data sets over vehicle-to-vehicle (V2V) networks as requested by other vehicles. Using vehicular micro clouds removes the need for connected vehicles to access remote cloud servers or edge servers by vehicle-to-network (V2N) communications (e.g., by cellular networks) whenever they need to get access to unused computing resources such as shared data (e.g., high-definition road map for automated driving), shared computational power, shared bandwidth, shared memory, and cloudification services.

Some of the embodiments described herein are motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over V2V networks or V2X networks to perform computation, data storage, and data communication tasks in an efficient way. These types of tasks are referred to herein as "network tasks" if plural, or a "network task" if singular.

In some embodiments, a network task includes any computational, data storage, or data communication task collaboratively performed by a plurality of the members of a vehicular micro cloud.

In some embodiments, a computational task includes a processor executing code and routines to output a result. The result includes digital data that describes the output of executing the code and routines. For example, a computational task includes a processor executing code and routines to solve a problem, and the result includes digital data that describes the solution to the problem. In some embodiments, the computational task is broken down into sub-tasks whose completion is equivalent to completion of the computational task. In this way, the processors of a plurality of micro cloud members are assigned different sub-tasks configured to complete the computational task; the micro cloud members take steps to complete the sub-tasks in parallel and share the result of the completion of the sub-task with one another via V2X wireless communication. In this way, the plurality of micro cloud members work together collaboratively to complete the computational task. The processors include, for example, the onboard units or electronic control units (ECUs) of a plurality of connected vehicles that are micro cloud members.

In some embodiments, a data storage task includes a processor storing digital data in a memory of a connected vehicle. For example, a digital data file which is too big to be stored in the memory of any one vehicle is stored in the memory of multiple vehicles. In some embodiments, the data storage task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data storage task includes storing a portion of a digital data file in a memory of a micro cloud member; other micro cloud members are assigned sub-tasks to store the remaining portions of digital data file in their memories so that collectively the entire file is stored across the vehicular micro cloud or a sub-set of the vehicular micro cloud.

In some embodiments, a data communication task includes a processor using some or all of the network bandwidth available to the processor (e.g., via the communication unit of the connected vehicle) to transmit a portion a V2X wireless message to another endpoint. For example, a V2X wireless message includes a payload whose file size is too big to be transmitted using the bandwidth available to any one vehicle and so the payload is broken into segments and transmitted at the same time (or contemporaneously) via multiple wireless messages by multiple micro cloud members. In some embodiments, the data communication task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data communication task includes transmitting a portion of a payload for a V2X message to a designated endpoint; other micro cloud members are assigned sub-tasks to transmit the remaining portions of payload using their available bandwidth so that collectively the entire payload is transmitted.

In some embodiments, a network task is collaboratively performed by the plurality of members executing computing processes in parallel which are configured to complete the execution of the network task.

In some embodiments, a vehicular micro cloud includes a plurality of members that execute computing processes whose completion results in the execution of a network task. For example, the serverless ad-hoc vehicular network provides a network task to a legacy vehicle.

Vehicular micro clouds are beneficial, for example, because they help vehicles to perform computationally expensive tasks that they could not perform alone or store large data sets that they could not store alone.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

In some embodiments, a typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors). This paragraph is not intended to limit the functionality of the embodiments described herein to data storage. As described herein, the embodiments are operable to provide other vehicular micro cloud tasks in addition to data storage tasks.

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

In some embodiments, the communication unit of an ego vehicle includes a V2X radio. The V2X radio operates in compliance with a V2X protocol. In some embodiments, the V2X radio is a cellular-V2X radio ("C-V2X radio"). In some embodiments, the V2X radio broadcasts Basic Safety Messages ("BSM" or "safety message" if singular, "BSMs" or "safety messages" if plural). In some embodiments, the safety messages broadcast by the communication unit include some or all of the system data as its payload. In some embodiments, the system data is included in part 2 of the safety message as specified by the Dedicated Short-Range Communication (DSRC) protocol. In some embodiments, the payload includes digital data that describes, among other things, sensor data that describes a roadway environment that includes the members of the vehicular micro cloud.

As used herein, the term "vehicle" refers to a connected vehicle. For example, the ego vehicle and remote vehicle depicted in FIG. 1 are connected vehicles. A connected vehicle is a conveyance, such as an automobile, that includes a communication unit that enables the conveyance to send and receive wireless messages via one or more vehicular networks. Accordingly, as used herein, the terms "vehicle" and "connected vehicle" may be used interchangeably. The embodiments described herein are beneficial for both drivers of human-driven vehicles as well as the autonomous driving systems of autonomous vehicles.

In some embodiments, the perception system improves the performance of a network because it beneficially takes steps enable the completion of vehicular micro cloud tasks.

In some embodiments, the perception system is software installed in an onboard unit (e.g., an electronic control unit (ECU)) of a vehicle having V2X communication capability. The vehicle is a connected vehicle and operates in a roadway environment with N number of remote vehicles that are also connected vehicles, where N is any positive whole number that is sufficient to satisfy a threshold for forming a vehicular micro cloud. The roadway environment may include one or more of the following example elements: an ego vehicle; N remote vehicles; an edge server; and a roadside unit. For the purpose of clarity, the N remote vehicles may be referred to herein as the "remote vehicle" or the "remote vehicles" and this will be understood to describe N remote vehicles.

An example of a roadway environment according to some embodiments includes the roadway environment 140 depicted in FIG. 1. As depicted, the roadway environment 140 includes objects. Examples of objects include one or of the following: other automobiles, road surfaces; signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 140 or otherwise observable or measurable by a camera or some other sensor included in the sensor set.

The ego vehicle and the remote vehicles may be human-driven vehicles, autonomous vehicles, or a combination of human-driven vehicles and autonomous vehicles. In some embodiments, the ego vehicle and the remote vehicles may be equipped with DSRC equipment such as a GPS unit that has lane-level accuracy and a DSRC radio that is capable of transmitting DSRC messages.

In some embodiments, the ego vehicle and some or all of the remote vehicles include their own instance of a perception system. For example, in addition to the ego vehicle, some or all of the remote vehicles include an onboard unit having an instance of the perception system installed therein.

In some embodiments, the ego vehicle and one or more of the remote vehicles are members of a vehicular micro cloud. In some embodiments, the remote vehicles are members of a vehicular micro cloud, but the ego vehicle is not a member of the vehicular micro cloud. In some embodiments, the ego vehicle and some, but not all, of the remote vehicles are members of the vehicular micro cloud. In some embodiments, the ego vehicle and some or all of the remote vehicles are members of the same vehicular macro cloud but not the same vehicular micro cloud, meaning that they are members of various vehicular micro clouds that are all members of the same vehicular macro cloud so that they are still interrelated to one another by the vehicular macro cloud.

An example of a vehicular micro cloud according to some embodiments includes the vehicular micro cloud 194 depicted in FIG. 1.

Accordingly, multiple instances of the perception system are installed in a group of connected vehicles. The group of connected vehicles are arranged as a vehicular micro cloud. As described in more detail below, the perception system further organizes the vehicular cloud into a set of nano clouds which are each assigned responsibility for completion of a sub-task. Each nano cloud includes at least one member of the vehicular micro cloud so that each nano cloud is operable to complete assigned sub-tasks of a vehicular micro cloud task for the benefit of the members of the vehicular micro cloud.

In some embodiments, a nano cloud includes a subset of a vehicular micro cloud that is organized within the vehicular micro cloud as an entity managed by a hub wherein the entity is organized for the purpose of a completing one or more sub-tasks of a vehicular micro cloud task.

In some embodiments, the ego vehicle and some or all of the remote vehicles are members of the same vehicular macro cloud but not the same nano cloud. In some embodiments, the ego vehicle and some or all of the remote vehicles are members of the same nano cloud.

A nano cloud includes a subset of the members of a vehicular micro cloud. The members of the nano cloud are assigned a sub-task to complete. In some embodiments, the members of the nano cloud are organized to form the nano cloud by a hub; the hub also assigns the members a sub-task to complete and optionally digital data describing instructions for which of the members should complete which aspects of the sub-task.

In some embodiments, each nano cloud includes digital data that describes a roster for that nano cloud. A roster for a particular nano cloud is digital data that describes which of the members of the vehicular micro cloud are assigned to be members of the particular nano cloud.

In some embodiments, a perception system creates a set of nano clouds to perform a plurality of sub-tasks. The plurality of sub-tasks are configured so that their completion will result in a completion of a vehicular micro cloud task. Each nano cloud in the set is assigned at least one sub-task from the plurality to perform. Each nano cloud includes at least one member of the vehicular micro cloud so that each nano cloud includes a membership roster. Different nano clouds in the set include different membership rosters relative to one another.

Hub or Hub Vehicle

In some embodiments, the perception system that executes a method as described herein (e.g., the method 300 depicted in FIG. 3, the first general example method described below, the second general example method described below, etc.) is an element of a hub or a hub vehicle. For example, the vehicular micro cloud formed by the perception system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIG. 1. In some embodiments, the roadway device 151 is the hub of the vehicular micro cloud 194.

In some embodiments, the perception system determines which member vehicle from a group of vehicles (e.g., the ego vehicle and one or more remote vehicles) will serve as the hub vehicle based on a set of factors that indicate which vehicle (e.g., the ego vehicle or one of the remote vehicles) is the most technologically sophisticated. For example, the member vehicle that has the fastest onboard computer may be the hub vehicle. Other factors that may qualify a vehicle to be the hub include one or more of the following: having the most accurate sensors relative to the other members; having the most bandwidth relative to the other members; and having the most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if the perception system determines that a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle includes a memory that stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include BSMs which include such sensor data in part 2 of their payload. In some embodiments, the technical data is included in the member data depicted in FIG. 1 which vehicles such as the ego vehicle 123 and the remote vehicle 124 broadcast to one another via BSMs. In some embodiments, the member data also includes the sensor data of the vehicle that transmits the BSM as well as some or all of the other digital data described herein as being an element of the member data.

A vehicle's sensor data is the digital data recorded by that vehicle's onboard sensor set 126. In some embodiments, an ego vehicle's sensor data includes the sensor data recorded by another vehicle's sensor set 126; in these embodiments, the other vehicle transmits the sensor data to the ego vehicle via a V2X communication such as a BSM or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the hub vehicle is whichever member vehicle of a vehicular micro cloud has a fastest onboard computer relative to the other member vehicles.

In some embodiments, the perception system is operable to provide its functionality to operating environments and network architectures that do not include a server. Use of servers is problematic because they create latency. For example, some prior art systems require that groups of vehicles relay all their messages to one another through a server. By comparison, the use of server is an optional feature for the perception system. For example, the perception system is an element of a roadside unit that includes a communication unit 145 but not a server. In another example, the perception system is an element of another vehicle such as one of the remote vehicles 124.

In some embodiments, the perception system is operable to provide its functionality even though the vehicle which includes the perception system does not have a Wi-Fi antenna as part of its communication unit. By comparison, some of the existing solutions require the use of a Wi-Fi antenna in order to provide their functionality. Because the perception system does not require a Wi-Fi antenna, it is able to provide its functionality to more vehicles, including older vehicles without Wi-Fi antennas.

In some embodiments, the perception system is operable to provide its functionality even though the vehicle which includes the perception system does not have a V2X radio as part of its communication unit. By comparison, some of the existing solutions require the use of a V2X radio in order to provide their functionality. Because the perception system does not require a V2X radio, it is able to provide its functionality to more vehicles, including older vehicles without V2X radios.

In some embodiments, the perception system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the perception system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud.

In some embodiments, the perception system manages the vehicular micro cloud so that it is accessible for membership by vehicles which do not have V2V communication capability. This is beneficial because it ensures that legacy vehicles have access to the benefits provided by the vehicular micro cloud. The existing approaches to task completion by a plurality of vehicles do not provide this functionality.

In some embodiments, the perception system is configured so that a particular vehicle (e.g., the ego vehicle) is pre-designated by a vehicle manufacturer to serve as a hub vehicle for any vehicular micro cloud that it joins. The existing approaches to task completion by a plurality of vehicles do not provide this functionality.

The existing solutions generally do not include vehicular micro clouds. Some groups of vehicles (e.g., cliques, platoons, etc.) might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one because of the latency created by communication with a server. Accordingly, any group of vehicles that includes a server or whose functionality incorporates a server is not a vehicular micro cloud as this term is used herein.

In some embodiments, a vehicular micro cloud formed by a perception system is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, the perception system is configured so that vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud is pre-designated by a vehicle manufacturer by the inclusion of one a bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of a method described herein (e.g., the method depicted in FIG. 3) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

In some embodiments, a vehicular micro cloud is operable to complete computational tasks itself, without delegation of these computational tasks to a cloud server, using the onboard vehicle computers of its members; this is an example of a vehicular micro cloud task according to some embodiments. In some embodiments, a group of vehicles which relies on a cloud server for its computational analysis, or the difficult parts of its computational analysis, is not a vehicular micro cloud. Although FIG. 1 depicts a server in an operating environment that includes the perception system, the server is an optional feature of the operating environment. An example of a preferred embodiment of the perception system does not include the server in the operating environment which includes the perception system.

In some embodiments, the perception system enables a group of vehicles to perform computationally expensive tasks that could not be completed by any one vehicle in isolation.

In some embodiments, each nano cloud included in a vehicular micro cloud includes its own hub which is responsible for organizing the operation of the members that are included in that particular nano cloud. For example, the hub of a nano cloud is responsible for maintaining and updating the roster for the hub, monitoring the performance of the sub-task, monitoring the efficiency of the completion of the sub-task, monitoring when members join or leave the vehicular micro cloud, communicating with other hubs of nano clouds to facilitate updates to the roster of the nano clouds to optimize performance of the sub-task or compensate for changes of circumstance caused by the membership in the vehicular micro cloud changing.

Cellular Vehicle to Everything (C-V2X)

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

GPS data includes digital data describing the location information outputted by the GPS unit. An example of a standard-compliant GPS unit according to some embodiments includes the standard-compliant GPS unit 150 depicted in FIG. 1.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

Currently, 75 MHz of the 5.9 GHz band is designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the perception system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

Vehicular Network

The perception system utilizes a vehicular network in some embodiments. A vehicular network includes, for example, one or more of the following: V2V; V2X; vehicle-to-network-to-vehicle (V2N2V); vehicle-to-infrastructure (V2I); cellular-V2X (C-V2X); any derivative or combination of the networks listed herein; and etc.

In some embodiments, the perception system includes software installed in an onboard unit of a connected vehicle. This software is the "perception system" described herein.

An example operating environment for the embodiments described herein includes an ego vehicle and, optionally, one or more remote vehicles. The ego vehicle the remote vehicle are connected vehicles having communication units that enable them to send and receive wireless messages via one or more vehicular networks. In some embodiments, the ego vehicle and the remote vehicle include an onboard unit having a perception system stored therein. An example of a preferred embodiment of the perception system includes a serverless operating environment. A serverless operating environment is an operating environment which includes at least one perception system and does not include a server.

Figure 3:
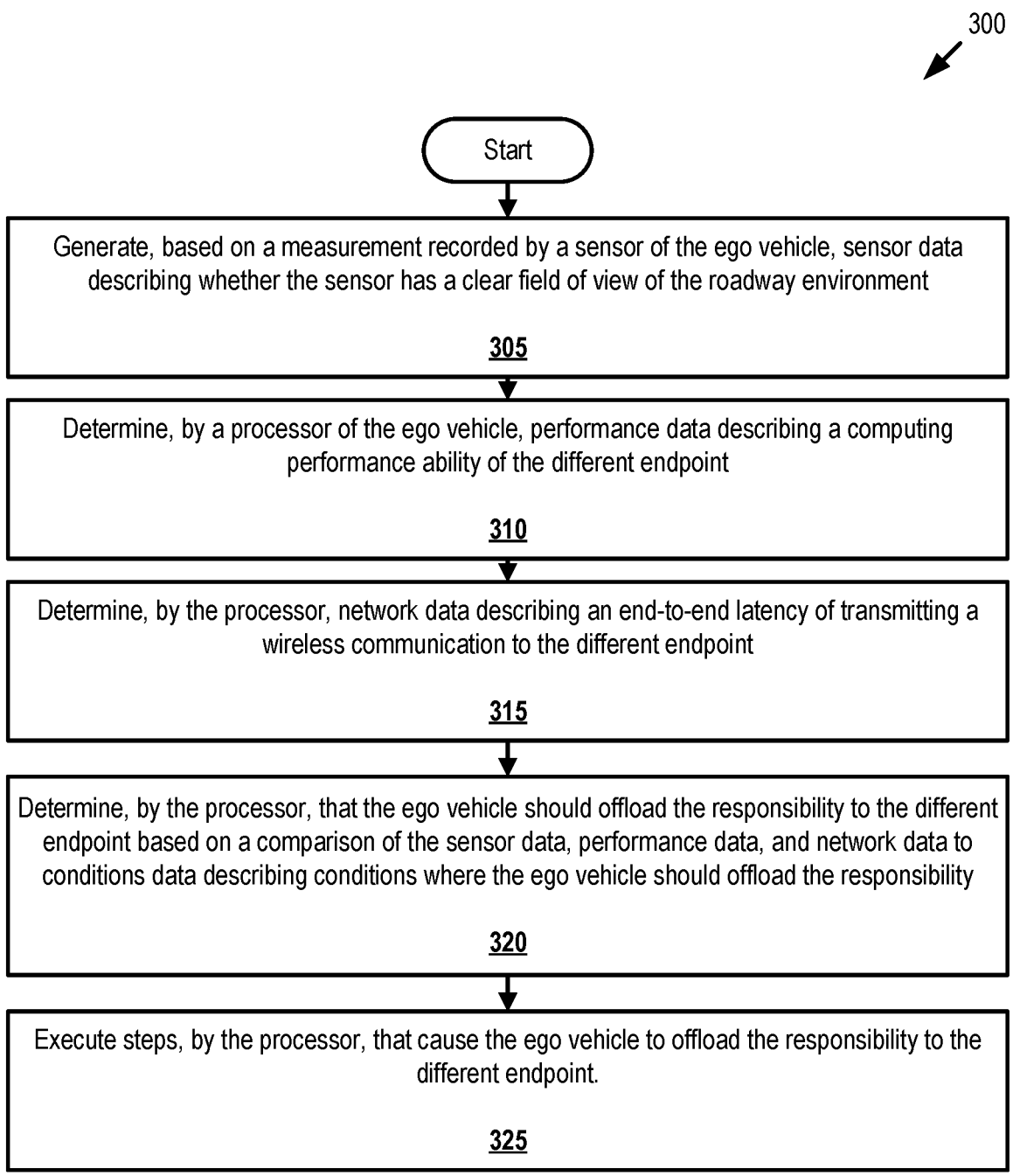
FIG. 3 is a flowchart of an example method for providing proxy environmental perception according to some embodiments.

In some embodiments, the perception system includes code and routines that are operable, when executed by a processor of the onboard unit, to cause the processor to execute one or more of the steps of the method 300 depicted in FIG. 3 or any other method described herein.

In some embodiments, this application is related to U.S. patent application Ser. No. 15/644,197 filed on Jul. 7, 2017 and entitled "Computation Service for Mobile Nodes in a Roadway Environment," the entirety of which is hereby incorporated by reference.

Example Overview

In some embodiments, the perception system is software that is operable to determine whether the ego vehicle should execute an environmental perception analysis based on a set of predetermined conditions and if not, offload responsibility for completing the environmental perception analysis to another trusted computing entity (e.g., the edge server, the cloud server, or the vehicular micro cloud which includes a set of connected vehicles).

Predetermined Conditions

The predetermined conditions include one or more of the following: (1) the ego vehicle has a clear sensor field of view; (2) relative to the trusted computing entities, the ego vehicle is not the best choice to execute the environmental perception analysis; and (3) the network conditions indicate that conditions are favorable for offloading responsibility for executing an environmental perception analysis by an edge server, cloud server, or vehicular micro cloud.

Other example predetermined conditions are described below according to some embodiments: (1) the ego vehicle cannot complete the environmental perception analysis within a deadline (e.g., next scheduled opportunity to send a Cooperative Perception Message); (2) the ego vehicle's perception algorithm is expected to have lower accuracy than that of the surrounding vehicles or servers; and (3) the ego vehicle is expected to have a good sensor field of view (e.g., the vehicle is at the head of queue at an intersection, the vehicle is just in front of a traffic accident scene)

An example operating environment 100 for the perception system is depicted in FIG. 1.

In some embodiments, the perception system 199 is software installed in an onboard unit (e.g., an electronic control unit (ECU)) of a particular make of vehicle having C-V2X communication capability. FIG. 1 depicts an example operating environment 100 for the perception system 199 according to some embodiments.

The First Example General Method

In some embodiments, the perception system includes code and routines that are operable, when executed by a processor, to cause the processor to execute one or more of the following steps in any order:

Step 1: (Optional) Form a vehicular micro cloud. This step is background technology described in other patent applications by the inventors of this patent application such as U.S. Pat. No. 10,334,405. Accordingly, this step is not described in detail herein. The vehicles that form the vehicular micro cloud are referred to as "members" of the vehicular micro cloud. The members exchange V2X messages with one another.

Step 2: Cause the onboard sensors of the ego vehicle to collect raw sensor data. The sensor data is digital data that describes one or more of the following sensor measurements about the ego vehicle and any other micro-cloud members (i.e., member vehicles) which are known to the ego vehicle: (1) whether the ego vehicle has a clear sensor field of view; (2) vehicle speed (of the ego vehicle or a set of member vehicles); (3) average speed of remote vehicles surrounding the ego vehicle (or a set of member vehicles); (4) images or other identifying information of objects in the environment; (5) the locations of the objects in the environment; and (6) any other sensor measurements that are beneficial to accurately perceiving the environment (e.g., heading, path history, etc.).

An example of the sensor data according to some embodiments includes the sensor data 195 depicted in FIG. 1.

In some embodiments, a context monitor executes step 2. An example of the context monitor according to some embodiments includes the context monitor 160 depicted in FIG. 1. In some embodiments, the context monitor 160 includes code and routines that are operable, when executed by the processor 125 depicted in FIG. 1 to cause the processor 125 to execute step 2.

Step 3: Determine if the ego vehicle has, or is expected to have, a clear sensor field of view.

In some embodiments, the context monitor executes step 3. An example of the context monitor according to some embodiments includes the context monitor 160 depicted in FIG. 1. In some embodiments, the context monitor 160 includes code and routines that are operable, when executed by the processor 125 depicted in FIG. 1 to cause the processor 125 to execute step 3.

Step 4: Determine the performance data. The performance data is digital data that describes the performance abilities of the onboards sensors, onboard unit, and perception algorithm of the ego vehicle, N remote vehicles, edge server, and cloud server. In some embodiments, the remote vehicles, edge server, and cloud server share their performance data with the ego vehicle via wireless communications so that the ego vehicle has access to this information. The performance data may be seen as describing the computing power and/or perception accuracy of the endpoints depicted in FIG. 1.

An example of the performance data according to some embodiments includes the performance data 173 depicted in FIG. 1.

In some embodiments, a performance profiler executes step 4. An example of the performance profiler according to some embodiments includes the performance profiler 161 depicted in FIG. 1. In some embodiments, the performance profiler 161 includes code and routines that are operable, when executed by the processor 125 depicted in FIG. 1 to cause the processor 125 to execute step 4.

Step 5: Determine the network data. The network data is digital data that describes the end-to-end latency of the network and communication cost of using the network to send and receive wireless messages that would result from offloading responsibility of the environmental perception analysis to another computing entity such as the edge server, cloud server, or vehicular micro cloud.

An example of the network data according to some embodiments includes the network data 191 depicted in FIG. 1.

In some embodiments, a network profiler executes step 5. An example of the network profiler according to some embodiments includes the network profiler 162 depicted in FIG. 1. In some embodiments, the network profiler 162 includes code and routines that are operable, when executed by the processor 125 depicted in FIG. 1 to cause the processor 125 to execute step 5.

Step 6: Retrieve the conditions data. The conditions data includes digital data describing the conditions where the ego vehicle should offload responsibility for executing the environmental perception analysis to another computing entity such as the edge server, cloud server, or vehicular micro cloud.

An example of the conditions data according to some embodiments includes the conditions data 171 depicted in FIG. 1.

Step 7: Determine that the ego vehicle should offload responsibility for executing an environmental perception analysis to another computing entity (i.e., a "selected computing entity"). In some embodiments, this determination is made based on whether the ego vehicle has a clear sensor field of view and how the performance data and the network data compare to the conditions data.

In some embodiments, step 7 includes functionality which is not described by the existing solutions. In some embodiments, an ego vehicle will offload responsibility for executing the environmental perception analysis if: the ego vehicle has a clear sensor field of view; inadequate computing power (as indicated by the relative performance data of all the candidate endpoints) or perception abilities relative to the other computing entities; and the network data indicates that offloading this responsibility to other computing entities is favorable.

The selected entity data includes digital data that describes the identity of the selected entity. For example, the selected entity data 133 describes the identity of the endpoint that is selected at step 7 to execute the environmental perception analysis. An example of the selected entity data according to some embodiments includes the selected entity data 133 depicted in FIG. 1.

In some embodiments, step 7 is executed by the task scheduler based on the following example decision criteria:

End-to-end latency (represented by variable "L"): Edge based proxy: (i) uplink communication latency to upload sensor data to a remote server, (ii) computation latency for the server to complete the environmental perception analysis and (iii) downlink communication latency to download the results of the environmental perception analysis from the remote server.

V2V-based proxy: (i) sidelink communication latency to send sensor data to one or more remote vehicle(s), (ii) computation latency for remote vehicle(s) to complete analysis data for the ego vehicle and (iii) sidelink communication latency to receive analysis data from one or more remote vehicle(s)

Perception accuracy (represented by variable "A"): The expected accuracy gain by executing the environmental perception analysis with more sophisticated perception algorithms Communication cost (represented by variable "C"): V2V/V2I communications typically requires no cost, while V2N (e.g., cellular) communications lead to certain amount of cost according to the amount of data traffic In some embodiments, the task scheduler makes the decision of step 7 based on a pre-defined utility function, which is now depicted according to some embodiments:

$$F(L,A,C) = w_1 g_l(L) + w_2 g_a(A) + w_3 g_c(C)$$

In some embodiments, $w_1$, $w_2$ and $w_3$ are pre-defined coefficients that reflect importance of each factor.

In some embodiments, $g_l(\ )$, $g_a(\ )$ and $g_c(\ )$ are per-factor utility functions that convert each factor into a normalized value between 0 and 1.

In some embodiments, the task scheduler selects the option that maximizes the utility function. An example of the task scheduler according to some embodiments includes the task scheduler 163 depicted in FIG. 1. In some embodiments, the task scheduler 163 includes code and routines that are operable, when executed by the processor 125 depicted in FIG. 1 to cause the processor 125 to execute step 7.

Step 8: Offload the sensor data and the responsibility for executing the environmental perception analysis to the selected computing entity.

Step 9: The selected computing entity completes the environmental perception analysis. The analysis data is digital data that describes the results of the environmental perception analysis. An example of the analysis data includes the analysis data 193 depicted in FIG. 1.

In some embodiments, the ego vehicle continues to transmit Cooperative Perception Messages ("CPM" if singular, "CPMs" if plural). For example, the CPM are broadcast. A CPM includes, within its payload, analysis data that is generated by the ego vehicle (and not any other computational entity). For example, the payload of a standard CPM includes the analysis data 193.

In some embodiments, the proxy environmental perception functionality provided by the perception system is enabled in addition to the standard CPMs only when pre-defined conditions are met. In these embodiments, an example benefit of the proxy environmental perception includes augmenting and improving the standard cooperative perception by providing a richer or more accurate data set in the payload of the CPM by the inclusion of the analysis data in the payload. For example, existing solutions that do not include the perception system do not provide analysis data or CPMs that include analysis data in the payloads for these CPMs.

In some embodiments, the ego vehicle re-broadcasts the analysis data received from the selected computing entity over V2X networks. For example, this analysis data is included in future CPMs broadcast by the ego vehicle. This step is beneficial, for example, in particular when the environmental perception analysis is offloaded to an edge server; this is because some remote vehicles may not have access to the edge server and not be able to receive the analysis data. If the environmental perception analysis is offloaded to a remote vehicle or a vehicular micro cloud, this additional step is skipped because the analysis data is already broadcast over V2X networks by these selected vehicles.

Step 10: The selected computing entity sends digital data describing the results of the environmental perception analysis to the ego vehicle and its neighboring vehicles.

Step 11: The ego vehicle receives the results of the environmental perception analysis.

Step 12: The ego vehicle modifies its operation based on the results of the environmental perception analysis. For example, the ego vehicle inputs the analysis data into an ADAS system of the ego vehicle.

The steps listed above can be executed in any order. In some embodiments, some of these steps are omitted are replaced by other steps.

The Second Example General Method

In some embodiments, the perception system includes code and routines that are operable, when executed by a processor, to cause the processor to execute one or more of the following steps in any order:

Step 1: Determine roadway context.

Step 2: Determine if predetermined conditions are met.

Step 3: Estimate an expected end-to-end latency, perception accuracy, and communication in the cases where: (a) the ego vehicle executes an environmental perception analysis locally; (b) a remote server executes the environmental perception analysis; (c) a remote vehicle executes the environmental perception analysis; and (d) a vehicular micro cloud executes environmental perception analysis.

Step 4: The task schedule determines where to execute the environmental perception analysis.

In some embodiments, if the ego vehicle is selected at step 4, then the ego vehicle executes the environmental perception analysis.

In some embodiments, if the edge server is selected at step 4, then the ego vehicle transmits the sensor data to the edge server and the edge server executes the environmental perception analysis and sends the analysis data to the ego vehicle and other vehicles in the vicinity (i.e., edge-based proxy). In some embodiments, the ego vehicle re-broadcasts the received analysis data over V2V networks so that remote vehicles that do not have access to the edge server can obtain the analysis data.

In some embodiments, if a remote vehicle or vehicular micro cloud is selected at step 4, then the ego vehicle transmits the sensor data to this computing entity and then the computing entity executes the environmental perception analysis and broadcasts the analysis data (i.e., V2V-based proxy). In some embodiments, the ego vehicle re-broadcasts the received analysis data over V2V networks to ensure that its one-hop neighbors can obtain the analysis data.

Example Operative Environment

In some embodiments, a vehicular micro cloud includes a group of connected vehicles where vehicles collaborate to perform data processing, sensing and communication tasks (e.g., vehicular micro cloud tasks) through V2X networks. Vehicle platooning, on the other hand, is an extended version of the Adaptive Cruise Control (ACC) system which maintains a proper following distance by slowing down once vehicles get too close. A platoon is not a vehicular micro cloud. A platoon is much more stable in terms of network dynamicity where platoon members are not changing frequently. In the vehicular micro cloud, on the other hand, there is more frequent network fragmentation due to fast topology changes which require additional and intelligent system and methods to ensure efficient and scalable micro cloud services and/or application.

As described herein, a vehicular nano cloud is proposed to provide efficient and scalable micro cloud services and/or applications. Embodiments include a perception system that is operable to divide the vehicular micro cloud task(s) into small sub-tasks and run them in parallel through using a set of nano clouds. In some embodiments, when a perception system determines to run a vehicular micro cloud task, the perception system first divides the task into sub-tasks and assigns sub-tasks to vehicular nano-cloud(s). In some embodiments, the task properties, road geometry, actual and/or predicted traffic information and resource capabilities of vehicles determine the number of nano clouds created by the perception system.

In some embodiments, after the sub-task creation and nano-clouds assignment, the perception system keeps track of each sub-task and each nano-cloud continuously. In some embodiments, the perception system dynamically changes the membership (e.g., rosters) and task assignments (assign one nano-cloud member to another nano-cloud or swap the sub-tasks) for the nano clouds. Each nano-cloud runs the assigned tasks and whenever the task is completed, the digital data describing the result is shared with the vehicular micro cloud. In the case where a nano cloud leaves the vehicular micro cloud, the nano cloud hands over the ongoing sub-task(s) to the nearest nano cloud or the nano cloud designated as the backup by the perception system. The perception system may perform re-organization when a nano-cloud and/or a member moves out of the vehicular micro cloud region.

An existing solution to vehicular task execution involves vehicle platoons. As explained herein, a platoon is not a vehicular micro cloud and does not provide the benefits of a vehicular micro cloud, and some embodiments of the perception system requires vehicular micro cloud; this distinction alone differentiates the perception system from the existing solutions. The perception system is different from the existing solution for additional reasons. For example, the existing solution that relies on vehicle platooning does not include functionality whereby the members of a platoon are changed among the platoons dynamically during the task execution. As another example, the existing solution does not consider the task properties, road geometry, actual and/or predicted traffic information and resource capabilities of vehicles to determine the number of platoons. The existing solution also does not include functionality whereby platoons swap which sub-task they are performing among themselves while the sub-tasks are still being performed by the platoons in parallel. The existing solution also does not include functionality whereby platoons are re-organized based on monitored task executions results/performance and/or available vehicles and resources. As described herein, the perception system includes code and routines that provide, among other things, all of this functionality which is lacking in the existing solution.

Embodiments of the perception system are now described. Referring now to FIG. 1, depicted is a block diagram illustrating an operating environment 100 for a perception system 199 according to some embodiments. The operating environment 100 is present in a roadway environment 140. In some embodiments, each of the elements of the operating environment 100 is present in the same roadway environment 140 at the same time. In some embodiments, some of the elements of the operating environment 100 are not present in the same roadway environment 140 at the same time.

The operating environment 100 may include one or more of the following elements: an ego vehicle 123 (referred to herein as a "vehicle 123" or an "ego vehicle 123"); an Nth remote vehicle 124 (where "N" refers to any positive whole number greater than one); a roadway device 151; and a cloud server 103. These elements are communicatively coupled to one another via a network 105. These elements of the operating environment 100 are depicted by way of illustration. In practice, the operating environment 100 may include one or more of the elements depicted in FIG. 1. The Nth remote vehicle 124 may be referred to as a remote vehicle 124.

The operating environment 100 also includes the roadway environment 140. The roadway environment 140 was described above, and that description will not be repeated here.

In some embodiments, one or more of the ego vehicle 123, the remote vehicle 124, and the network 105 are elements of a vehicular micro cloud 194. The cloud server 103 is depicted with a dashed line to indicate that it is an optional feature of the operating environment 100. As depicted, the roadway device 151 includes an edge server 104. According to some embodiments, the edge server 104 is an optional feature of the operating environment 100.

In some embodiments, the ego vehicle 123, the remote vehicle 124, the edge server 104, and the cloud server 103 include similar elements. For example, each of these elements of the operating environment 100 include their own processor 125, bus 121, memory 127, communication unit 145, processor 125, sensor set 126, onboard unit 139 (not included in the edge server 104 or the cloud server 103), standard-compliant GPS unit 150 (not included in the edge server 104 or the cloud server 103), and perception system 199. These elements of the ego vehicle 123, the remote vehicle 124, the edge server 104, and the cloud server 103 provide the same or similar functionality regardless of whether they are included in the ego vehicle 123, the remote vehicle 124, the edge server 104, and the cloud server 103. Accordingly, the descriptions of these elements will not be repeated in this description for each of the ego vehicle 123, the remote vehicle 124, the edge server 104, and the cloud server 103.

In the depicted embodiment, the ego vehicle 123, the remote vehicle 124, the edge server 104, and the cloud server 103 store similar digital data.

In some embodiments, the vehicular micro cloud 194 is a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference.

In some embodiments, the vehicular micro cloud 194 is a stationary vehicular micro cloud or a mobile vehicular micro cloud. For example, each of the ego vehicle 123 and the remote vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used in this patent application, the terms a "vehicular micro cloud" and a "micro-vehicular" cloud mean the same thing.

In some embodiments, the vehicular micro cloud 194 is a vehicular micro cloud such as the one described in U.S. patent application Ser. No. 15/799,963.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote vehicle 124, etc.) which has completed a process to join the vehicular micro cloud 194 (e.g., a handshake process with the coordinator of the vehicular micro cloud 194). Cloud servers are excluded from membership in some embodiments. A member of the vehicular micro cloud 194 is described herein as a "member" or a "micro cloud member." In some embodiments, a coordinator of the vehicular micro cloud 194 is the hub of the vehicular micro cloud (e.g., the ego vehicle 123).

In some embodiments, the memory 127 of one or more of the endpoints stores member data. The member data is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data describes logical associations between endpoints which are a necessary component of the vehicular micro cloud 194 and serves to differentiate the vehicular micro cloud 194 from a mere V2X network. In some embodiments, a vehicular micro cloud 194 must include a hub vehicle and this is a further differentiation from a vehicular micro cloud 194 and a V2X network or a group, clique, or platoon of vehicles which is not a vehicular micro cloud 194.

In some embodiments, the vehicular micro cloud 194 does not include a hardware server. Accordingly, in some embodiments the vehicular micro cloud 194 may be described as serverless. In some embodiments, the vehicular micro cloud 194 includes a server. For example, in some embodiments the edge server 104 is the hub of the vehicular micro cloud 194.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network.

In some embodiments, the network 105 is a C-V2X network.

The network 105 is an element of the vehicular micro cloud 194. Accordingly, the vehicular micro cloud 194 is not the same thing as the network 105 since the network is merely a component of the vehicular micro cloud 194. For example, the network 105 does not include member data. The network 105 also does not include a hub vehicle.

In some embodiments, one or more of the ego vehicle 123 and the remote vehicle 124 are C-V2X equipped vehicles. For example, the ego vehicle 123 includes a standard-compliant GPS unit 150 that is an element of the sensor set 126 and a C-V2X radio that is an element of the communication unit 145. The network 105 may include a C-V2X communication channel shared among the ego vehicle 123 and a second vehicle such as the remote vehicle 124.

A C-V2X radio is hardware radio that includes a C-V2X receiver and a C-V2X transmitter. The C-V2X radio is operable to wirelessly send and receive C-V2X messages on a band that is reserved for C-V2X messages.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105. For example, the ego vehicle 123 transmits and receives V2X messages via the network 105.

The ego vehicle 123 includes one or more of the following elements: a processor 125; a sensor set 126; a standard-compliant GPS unit 150; a vehicle control system 153 (see, e.g., FIG. 2); a communication unit 145; an onboard unit 139; a memory 127; and a perception system 199. These elements may be communicatively coupled to one another via a bus 121. In some embodiments, the communication unit 145 includes a V2X radio.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 may be an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; a vehicle control system (e.g., an advanced driver assistance system ("ADAS") or autonomous driving system); and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the perception system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 may record sensor measurements that describe the ego vehicle 123 or the physical environment that includes the ego vehicle 123. The sensor data includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 is operable to record sensor data 195. The sensor data 195 includes digital data that describes images or other measurements of the physical environment such as the conditions, objects, and other vehicles present in the roadway environment. Examples of objects include pedestrians, animals, traffic signs, traffic lights, potholes, etc. Examples of conditions include weather conditions, road surface conditions, shadows, leaf cover on the road surface, any other condition that is measurable by a sensor included in the sensor set 126.

The physical environment may include a roadway region, parking lot, or parking garage that is proximate to the ego vehicle 123. The sensor data may describe measurable aspects of the physical environment. In some embodiments, the physical environment is the roadway environment 140. As such, in some embodiments, the roadway environment 140 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123; any other tangible object that is present in the real-world and proximate to the ego vehicle 123 or otherwise measurable by the sensors of the sensor set 126 or whose presence is determinable from the digital data stored on the memory 127. An item is "proximate to the ego vehicle 123" if it is directly measurable by a sensor of the ego vehicle 123 or its presence is inferable and/or determinable by the perception system 199 based on analysis of the sensor data which is recorded by the ego vehicle 123 and/or one or more of the vehicular micro cloud 194.

In some embodiments, the sensor data 195 includes, among other things, one or more of the following: lidar data (i.e., depth information) recorded by an ego vehicle; or camera data (i.e., image information) recorded by the ego vehicle. The lidar data includes digital data that describes depth information about a roadway environment 140 recorded by a lidar sensor of a sensor set 126 included in the ego vehicle 123. The camera data includes digital data that describes the images recorded by a camera of the sensor set 126 included in the ego vehicle 123.

In some embodiments, the sensors of the sensor set 126 are operable to collect sensor data 195. The sensors of the sensor set 126 include any sensors that are necessary to measure and record the measurements described by the sensor data 195. In some embodiments, the sensor data 195 includes any sensor measurements that are necessary to generate the other digital data stored by the memory 127. In some embodiments, the sensor data 195 includes digital data that describes any sensor measurements that are necessary for the perception system 199 provides its functionality as described herein with reference to the method 300 depicted in FIG. 3.

In some embodiments, the sensor set 126 includes any sensors that are necessary to record sensor data 195 that describes the roadway environment 140 in sufficient detail to create a digital twin of the roadway environment 140. In some embodiments, the perception system 199 generates the set of nano clouds and assigns sub-tasks to the nano clouds based on the outcomes observed by the perception system 199 during the execution of a set of digital twins that simulate the real-life circumstances of the ego vehicle 123.

For example, in some embodiments the perception system 199 includes simulation software. The simulation software is any simulation software that is capable of simulating an execution of a vehicular micro cloud task by the vehicular micro cloud 194. For example, the simulation software is a simulation software that is capable of conducting a digital twin simulation. In some embodiments, the vehicular micro cloud 194 is divided into a set of nano clouds.

A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is similar to the real-world roadway environment 140 of the real-world vehicle. The simulation software includes code and routines that are operable to execute simulations based on digital twins of real-world vehicles in the roadway environment.

In some embodiments, the simulation software is integrated with the perception system 199. In some other embodiments, the simulation software is a standalone software that the perception system 199 can access to execute digital twin simulations to determine the best way to divide the vehicular micro cloud 194 into nano clouds and which sub-tasks to assign which nano clouds. The digital twin simulations may also be used by the perception system 199 to determine how to break down the vehicular micro cloud task into sub-tasks.

Digital twins, and an example process for generating and using digital twins which is implemented by the perception system 199 in some embodiments, are described in U.S. patent application Ser. No. 16/521,574 entitled "Altering a Vehicle based on Driving Pattern Comparison" filed on Jul. 24, 2019, the entirety of which is hereby incorporated by reference.

The sensor data 195 includes digital data that describes any measurement that is taken by one or more of the sensors of the sensor set 126.

The standard-compliant GPS unit 150 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes.

An example of an attribute for GPS data is accuracy. In some embodiments, the standard-compliant GPS unit 150 is operable to generate GPS measurements which are sufficiently accurate to describe the location of the ego vehicle 123 with lane-level accuracy. Lane-level accuracy is necessary to comply with some of the existing and emerging standards for V2X communication (e.g., C-V2X communication). Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 150 is compliant with one or more standards governing V2X communications but does not provide GPS measurements that are lane-level accurate.

In some embodiments, the standard-compliant GPS unit 150 includes any hardware and software necessary to make the ego vehicle 123 or the standard-compliant GPS unit 150 compliant with one or more of the following standards governing V2X communications, including any derivative or fork thereof: EN 12253:2004 Dedicated Short-Range Communication-Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the standard-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this vehicle 123 as provided by the standard-compliant GPS unit 150.

An example process for generating GPS data describing a geographic location of an object (e.g., a queue, the ego vehicle 123, the remote vehicle 124, or some other object located in a roadway environment) is now described according to some embodiments. In some embodiments, the perception system 199 include code and routines that are operable, when executed by the processor 125, to cause the processor to: analyze (1) GPS data describing the geographic location of the ego vehicle 123 and (2) sensor data describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the standard-compliant GPS unit 150 includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the ego vehicle 123) are located in adjacent lanes of travel on a roadway. In some embodiments, the standard-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the perception system 199 described herein may analyze the GPS data provided by the standard-compliant GPS unit 150 and determine what lane the ego vehicle 123 is traveling in based on the relative positions of two or more different vehicles (one of which is, for example, the ego vehicle 123) traveling on a roadway at the same time.

By comparison to the standard-compliant GPS unit 150, a conventional GPS unit which is not compliant with the DSRC standard is unable to determine the location of a vehicle (e.g., the ego vehicle 123) with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to enable the perception system 199 to determine the lane of travel of the ego vehicle 123. This measurement improves the accuracy of the GPS data describing the location of lanes used by the ego vehicle 123 when the perception system 199 is providing its functionality.

In some embodiments, the memory 127 stores two types of GPS data. The first is GPS data of the ego vehicle 123 and the second is GPS data of one or more objects (e.g., the remote vehicle 124 or some other object in the roadway environment). The GPS data of the ego vehicle 123 is digital data that describes a geographic location of the ego vehicle 123. The GPS data of the objects is digital data that describes a geographic location of an object. One or more of these two types of GPS data may have lane-level accuracy.

In some embodiments, one or more of these two types of GPS data are described by the sensor data 195. For example, the standard-compliant GPS unit 150 is a sensor included in the sensor set 126 and the GPS data is an example type of sensor data 195.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the perception system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369, 262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the method 300 depicted in FIG. 3 are transmitted by the C-V2X radio on the upper 30 MHz of the 5.9 GHz band (i.e., 5.895-5.925 GHz) as directed by the perception system 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs or CPMs. In some embodiments, the non-transitory memory stores a buffered version of the GPS data for the ego vehicle 123 so that the GPS data for the ego vehicle 123 is broadcast as an element of the BSMs or CPMs which are regularly broadcast by the V2X radio (e.g., at an interval of once every 0.10 seconds).

In some embodiments, the V2X radio includes any hardware or software which is necessary to make the ego vehicle 123 compliant with the DSRC standards. In some embodiments, the standard-compliant GPS unit 150 is an element of the V2X radio.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the sensor data 195; threshold data 196; the conditions data 171; the network data 191; the selected entity data 133; the analysis data 193; and the performance data 173. In some embodiments, the V2X messages (or C-V2X messages) described herein are also stored in the memory 127. These elements were described above with reference to the example general method, and so, those descriptions will not be repeated here: the sensor data 195; the conditions data 171; the network data 191; the selected entity data 133; the analysis data 193; and the performance data 173.

The threshold data 196 includes digital data that describes any threshold described herein.

In some embodiments, the ego vehicle 123 includes a vehicle control system. A vehicle control system includes one or more ADAS systems or an autonomous driving system.

Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system of the ego vehicle 123 that is operable to identify one or more factors (e.g., using one or more onboard vehicle sensors) affecting the ego vehicle 123 and modify (or control) the operation of the ego vehicle to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle may have a LKA system installed and operational in an ego vehicle may detect, using one or more external cameras of the ego vehicle, an event in which the ego vehicle is near passing a center yellow line which indicates a division of one lane of travel from another lane of travel on a roadway. The LKA system may provide a notification to a driver of the ego vehicle that this event has occurred (e.g., an audible noise or graphical display) or take action to prevent the ego vehicle from actually passing the center yellow line such as making the steering wheel difficult to turn in a direction that would move the ego vehicle over the center yellow line or actually moving the steering wheel so that the ego vehicle is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the ego vehicle 123 to render the ego vehicle 123 an autonomous or semi-autonomous vehicle.

An autonomous driving system includes a set of ADAS systems whose operation render sufficient autonomous functionality to render the ego vehicle 123 an autonomous vehicle (e.g., a Level III autonomous vehicle or higher as defined by the National Highway Traffic Safety Administration and the Society of Automotive Engineers).

In some embodiments, the perception system 199 includes code and routines that are operable, when executed by the processor 125, to execute one or more steps of the method 300 described below with reference to FIG. 3. In some embodiments, the perception system 199 includes code and routines that are operable, when executed by the processor 125, to execute one or more steps of the first example general method described above. In some embodiments, the perception system 199 includes code and routines that are operable, when executed by the processor 125, to execute one or more steps of the second example general method described above.

As depicted in FIG. 1, the perception system 199 includes: the context monitor 160; the performance profiler 161; the network profiler 162; and the task scheduler 163.

These elements of the perception system 199 were described above, and so, those descriptions will not be repeated here.

Figure 2:
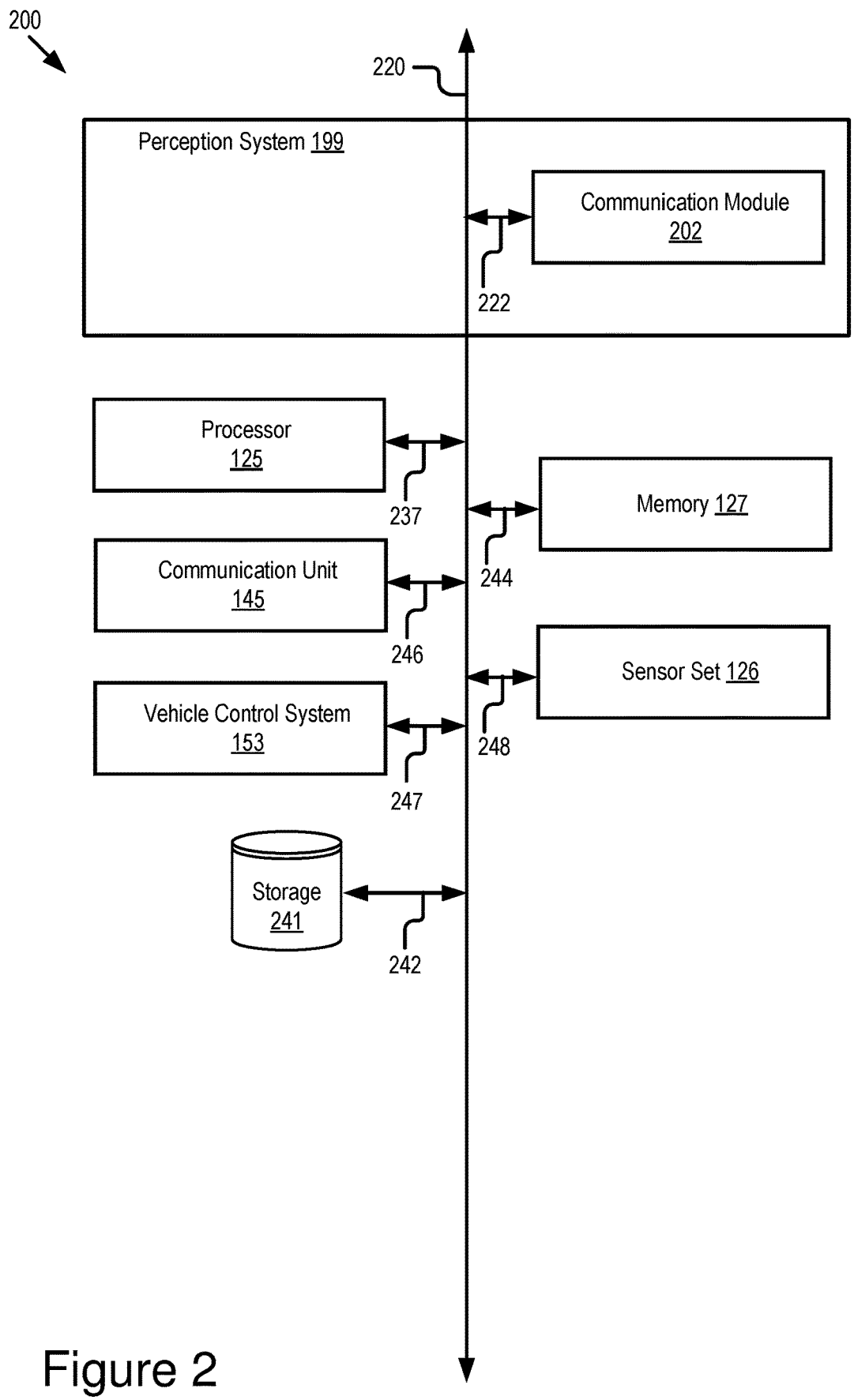
FIG. 2 is a block diagram illustrating an example computer system including a perception system according to some embodiments.

An example embodiment of the perception system 199 is depicted in FIG. 2. This embodiment is described in more detail below.

In some embodiments, the perception system 199 is an element of the onboard unit 139 or some other onboard vehicle computer. In some embodiments, the perception system 199 includes code and routines that are stored in the memory 127 and executed by the processor 125 or the onboard unit 139.

In some embodiments, the perception system 199 is implemented using hardware including a field-programmable gate array ("FPGA") or an application-specific integrated circuit ("ASIC"). In some other embodiments, the perception system 199 is implemented using a combination of hardware and software.

The remote vehicle 124 includes elements and functionality which are similar to those described above for the ego vehicle 123, and so, those descriptions will not be repeated here.

In some embodiments, the ego vehicle 123, the remote vehicle, and the roadway device 151 are located in a roadway environment 140. The roadway environment is a portion of the real-world that includes a roadway, the ego vehicle 123 and the remote vehicle 124. The roadway environment 140 may include other elements such as the vehicular micro cloud 194, roadway signs, environmental conditions, traffic, etc. The roadway environment 140 includes some or all of the tangible and/or measurable qualities described above with reference to the sensor data.

In some embodiments, the real-world includes the real of human experience comprising physical objects and excludes artificial environments and "virtual" worlds such as computer simulations.

In some embodiments, the roadway environment 140 includes a roadway device 151 that in includes an edge server 104. The edge server 104 is a connected processor-based computing device that is not a member of the vehicular micro cloud 194 and includes an instance of the perception system 199 and a memory 127.

In some embodiments, the edge server 104 is one or more of the following: a hardware server; a personal computer; a laptop; a device such as a roadside unit which is not a member of the vehicular micro cloud 194; or any other processor-based connected device that is not a member of the vehicular micro cloud 194 and includes an instance of the perception system 199 and a non-transitory memory that stores some or all of the digital data that is stored by the memory 127 of the ego vehicle 123 or otherwise described herein. In some embodiments, the edge server 104 includes a backbone network.

The edge server 104 includes an instance of the perception system 199. In some embodiments, the perception system 199 includes code and routines that are operable, when executed by the processor 125, to execute one or more steps of the method 300 described below with reference to FIG. 3.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123, the remote vehicle 124, etc.), and optionally devices such as a roadway device 151, form a cluster of interconnected vehicles that are located at a same geographic region. These connected vehicles (and, optionally, connected devices) are interconnected via C-V2X, Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 103. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein are encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the perception system 199 includes encryption keys for encrypting wireless messages and decrypting the wireless messages described herein.

In some embodiments, the cloud server 103 is one or more of the following: a hardware server; a personal computer; a laptop; a device such as a roadside unit which is not a member of the vehicular micro cloud 194; or any other processor-based connected device that is not a member of the vehicular micro cloud 194 and includes an instance of the perception system 199 and a non-transitory memory that stores some or all of the digital data that is stored by the memory 127 of the ego vehicle 123 or otherwise described herein.

The cloud server 103 includes an instance of the perception system 199. In some embodiments, the perception system 199 includes code and routines that are operable, when executed by the processor 125, to execute one or more steps of the method 300 described below with reference to FIG. 3. In some embodiments, the perception system 199 includes code and routines that are operable, when executed by the processor 125, to execute one or more steps of the example general method described above.

In some embodiments, the cloud server 103 is a conventional hardware server that is improved by inclusion and execution of the perception system 199.

Referring now to FIG. 2, depicted is a block diagram illustrating an example computer system 200 including a perception system 199 according to some embodiments.

In some embodiments, the computer system 200 may include a special-purpose computer system that is programmed to perform one or more steps of one or more of the method 300 described herein with reference to FIG. 3 and the example general method described above.

In some embodiments, the computer system 200 may include a processor-based computing device. For example, the computer system 200 may include an onboard vehicle computer system of the ego vehicle 123 or the remote vehicle 124.

The computer system 200 may include one or more of the following elements according to some examples: the perception system 199; a processor 125; a communication unit 145; a vehicle control system 153; a storage 241; and a memory 127. The components of the computer system 200 are communicatively coupled by a bus 220.

In some embodiments, the computer system 200 includes additional elements such as those depicted in FIG. 1 as elements of the perception system 199.

In the illustrated embodiment, the processor 125 is communicatively coupled to the bus 220 via a signal line 237. The communication unit 145 is communicatively coupled to the bus 220 via a signal line 246. The vehicle control system 153 is communicatively coupled to the bus 220 via a signal line 247. The storage 241 is communicatively coupled to the bus 220 via a signal line 242. The memory 127 is communicatively coupled to the bus 220 via a signal line 244. The sensor set 126 is communicatively coupled to the bus 220 via a signal line 248.

In some embodiments, the sensor set 126 includes standard-compliant GPS unit. In some embodiments, the communication unit 145 includes a sniffer.

The following elements of the computer system 200 were described above with reference to FIG. 1, and so, these descriptions will not be repeated here: the processor 125; the communication unit 145; the vehicle control system 153; the memory 127; and the sensor set 126.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the perception system 199 includes code and routines that are operable, when executed by the processor 125, to cause the processor 125 to execute one or more steps of the method 300 described herein with reference to FIG. 3. In some embodiments, the perception system 199 includes code and routines that are operable, when executed by the processor 125, to cause the processor 125 to execute one or more steps of the first example general method. In some embodiments, the perception system 199 includes code and routines that are operable, when executed by the processor 125, to cause the processor 125 to execute one or more steps of the second example general method.

In the illustrated embodiment shown in FIG. 2, the perception system 199 includes a communication module 202.

The communication module 202 can be software including routines for handling communications between the perception system 199 and other components of the computer system 200. In some embodiments, the communication module 202 can be a set of instructions executable by the processor 125 to provide the functionality described below for handling communications between the perception system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the perception system 199 and stores the data in one or more of the storage 241 and the memory 127.

In some embodiments, the communication module 202 may handle communications between components of the perception system 199 or the computer system 200.

Referring now to FIG. 3, depicted is a flowchart of an example method 300. The method 300 includes step 305, step 310, step 315, step 320, and step 325 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art of vehicular micro clouds.

Example differences in technical effect between the method 300 and the prior art are described below. These examples are illustrative and not exhaustive of the possible differences.

Existing solutions require the use of vehicle platooning. In some embodiments, a first difference in technical effect is that the existing solutions do not include a vehicular micro cloud. By comparison, embodiments of the perception system use a vehicular micro cloud to provide its functionality. A platoon is not a vehicular micro cloud and does not provide the benefits of a vehicular micro cloud, and some embodiments of the perception system that require a vehicular micro cloud.

Described generally, existing solutions to the problem of V2X communication do not foresee or address the problem of cooperative perception messages creating a bottleneck in V2X channels. Furthermore, the existing solutions also generally do not propose tracking view angle overlap and determining how much sensor data to include in V2X messages based on view angle overlap so that V2X channels are not bottleneck. By comparison, the perception system includes such functionality.

More specific differences in technical effect are now described. These descriptions refer to the perception system as an element of an ego vehicle which is determining how much sensor data to share with a roadside device so that clogging of V2X communication channels is reduced. The roadside device may be another connected vehicle (e.g., a remote vehicle) or a roadside unit. In general, there are two different types of sensor data managed by the perception system: lidar data; and camera data. The management rules applied by the perception system are variable based on whether the sensor data is lidar data or camera data.

A first difference in technical effect is that the existing solutions do not determine that an ego vehicle should offload a responsibility for executing an environmental perception analysis to a different endpoint of a vehicular micro cloud by determining a field of view of the ego vehicle.

A second difference in technical effect is that the existing solutions do not determine that an ego vehicle should offload a responsibility for executing an environmental perception analysis to a different endpoint of a vehicular micro cloud by determining the computing performance ability of the different endpoint.

A third difference in technical effect is that the existing solutions do not determine that an ego vehicle should offload a responsibility for executing an environmental perception analysis to a different endpoint of a vehicular micro cloud by determining an end-to-end latency of transmitting wireless communications to the endpoint.

A fourth difference in technical effect is that the existing solutions do not determine that an ego vehicle should offload a responsibility for executing an environmental perception analysis to a different endpoint of a vehicular micro cloud by comparing the field of view, computing performance ability, and end-to-end latency to conditions data which describes the conditions where the ego vehicle should offload the responsibility for executing the environmental perception analysis to another endpoint of the vehicular micro cloud.

A fifth difference in technical effect is that the existing solutions do not determine that an ego vehicle should offload a responsibility for executing an environmental perception analysis to a different endpoint of a vehicular micro cloud by determining to offload the responsibility to the different endpoint based on the comparison described above for the fourth difference in technical effect.

A sixth difference in technical effect is that the existing solutions do not determine that an ego vehicle should offload a responsibility for executing an environmental perception analysis to a different endpoint of a vehicular micro cloud by executing a method that includes one or more of the following steps in any order: (1) determining a field of view of the ego vehicle; (2) determining the computing performance ability of the different endpoint; (3) determining an end-to-end latency of transmitting wireless communications to the endpoint; (4) comparing the field of view, computing performance ability, and end-to-end latency to conditions data which describes the conditions where the ego vehicle should offload the responsibility for executing the environmental perception analysis to another endpoint of the vehicular micro cloud; and (5) determining to offload the responsibility to the different endpoint based on the comparison of step (4).

A seventh difference in technical effect is that the existing solutions do not disclose or suggest that the different endpoint is another computing entity such as a particular remote vehicle, an edge server, a cloud server, or a vehicular micro cloud which handles the environmental perception analysis in a distributed manner.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for an ego vehicle to offload a responsibility for executing an environmental perception analysis of a roadway environment to a different endpoint of a vehicular micro cloud that includes the ego vehicle, the method including:

generating, based on a measurement recorded by a sensor of the ego vehicle, sensor data describing whether the sensor has a clear field of view of the roadway environment;

determining, by a processor of the ego vehicle, performance data describing a computing performance ability of the different endpoint;

determining, by the processor, network data describing an end-to-end latency of transmitting a wireless communication to the different endpoint;

determining, by the processor, that the ego vehicle should offload the responsibility to the different endpoint based on a comparison of the sensor data, the performance data, and the network data to conditions data describing conditions where the ego vehicle should offload the responsibility; and executing steps, by the processor, that cause the ego vehicle to offload the responsibility to the different endpoint.

2. The method of claim 1, wherein the ego vehicle is a leader node of the vehicular micro cloud that is responsible for managing when endpoints of the vehicular micro cloud enter and exit the vehicular micro cloud.

3. The method of claim 1, wherein the method is a perception service and the ego vehicle is a leader node of the vehicular micro cloud that provides the perception service to endpoints of the vehicular micro cloud.

4. The method of claim 1, wherein the different endpoint is selected from a group that includes: a remote vehicle; a cloud server; an edge server; or the vehicular micro cloud itself.

5. The method of claim 1, wherein the sensor data indicates that the sensor has a clear field of view, wherein the clear field of view is a field of view that satisfies a clarity threshold.

6. The method of claim 1, wherein the conditions are selected from a group that includes: the sensor data indicates that the sensor has a clear field of view; the processor of the ego vehicle has a computing power that is less than the different endpoint; the sensor of the ego vehicle has a perception ability that is less than the different endpoint; or the network data indicates that offloading the responsibility would satisfy a latency threshold.

7. The method of claim 1, wherein the steps for offloading the responsibility are scheduled by a task scheduler of the ego vehicle based on a set of criteria.

8. A non-transitory computer program product included in at least one onboard vehicle computer of an ego vehicle which is operable to offload a responsibility for executing an environmental perception analysis of a roadway environment to a different endpoint of a vehicular micro cloud that includes the ego vehicle, the computer program product comprising computer code that is operable, when executed by the onboard vehicle computer, to cause the onboard vehicle computer to execute steps including:

receiving sensor data describing whether a sensor of the ego vehicle has a clear field of view of the roadway environment;

determining performance data describing a computing performance ability of the different endpoint;

determining network data describing an end-to-end latency of transmitting a wireless communication to the different endpoint;

determining that the ego vehicle should offload the responsibility to the different endpoint based on a comparison of the sensor data, the performance data, and the network data to conditions data describing conditions where the ego vehicle should offload the responsibility; and executing steps that cause the ego vehicle to offload the responsibility to the different endpoint.

9. The computer program product of claim 8, wherein the ego vehicle is a leader node of the vehicular micro cloud that is responsible for managing when endpoints of the vehicular micro cloud enter and exit the vehicular micro cloud.

10. The computer program product of claim 8, wherein executing the steps includes providing a perception service and the ego vehicle is a leader node of the vehicular micro cloud that provides the perception service to endpoints of the vehicular micro cloud.

11. The computer program product of claim 8, wherein the different endpoint is selected from a group that includes: a remote vehicle; a cloud server; an edge server; or the vehicular micro cloud itself.

12. The computer program product of claim 8, wherein the sensor data indicates that the sensor does not have a clear field of view, wherein the clear field of view is a field of view that satisfies a clarity threshold.

13. The computer program product of claim 8, wherein the conditions are selected from a group that includes: the sensor data indicates that the sensor has an clear field of view; a processor of the ego vehicle has a computing power that is less than the different endpoint; the sensor of the ego vehicle has a perception ability that is less than the different endpoint; or the network data indicates that offloading the responsibility would satisfy a latency threshold.

14. The computer program product of claim 8, wherein the steps for offloading the responsibility are scheduled by a task scheduler of the ego vehicle based on a set of criteria.

15. A system included in an ego vehicle which is operable to offload a responsibility for executing an environmental perception analysis of a roadway environment to a different endpoint of a vehicular micro cloud that includes the ego vehicle, the system comprising:

a processor;

a communication unit;

a non-transitory memory communicatively coupled to the processor and the communication unit, which are communicatively coupled to one another, wherein the non-transitory memory stores executable code that is operable, when executed by the processor, to cause the processor to:

receive, from a sensor of the ego vehicle, sensor data describing whether the sensor has a clear field of view of the roadway environment;

determine performance data describing a computing performance ability of the different endpoint;

determine network data describing an end-to-end latency of transmitting a wireless communication to the different endpoint;

determine that the ego vehicle should offload the responsibility to the different endpoint based on a comparison of the sensor data, the performance data, and the network data to conditions data describing conditions where the ego vehicle should offload the responsibility; and execute steps that cause the ego vehicle to offload the responsibility to the different endpoint.

16. The system of claim 15, wherein the ego vehicle is a leader node of the vehicular micro cloud that is responsible for managing when endpoints of the vehicular micro cloud enter and exit the vehicular micro cloud.

17. The system of claim 15, wherein executing the steps includes providing a perception service and the ego vehicle is a leader node of the vehicular micro cloud that provides the perception service to endpoints of the vehicular micro cloud.

18. The system of claim 15, wherein the different endpoint is selected from a group that includes: a remote vehicle; a cloud server; an edge server; or the vehicular micro cloud itself.

19. The system of claim 15, wherein the sensor data indicates that the sensor has a clear field of view, wherein the clear field of view is a field of view that satisfies a clarity threshold.

20. The system of claim 15, wherein the conditions are selected from a group that includes: the sensor data indicates that the sensor has a clear field of view; the processor of the ego vehicle has a computing power that is less than the different endpoint; the sensor of the ego vehicle has a perception ability that is less than the different endpoint; or the network data indicates that offloading the responsibility would satisfy a latency threshold.

\* \* \* \* \*